US008556692B2

(12) United States Patent  
Mimura (10) Patent No.: US 8,556,692 B2
(45) Date of Patent: Oct. 15, 2013

(54) GAME DEVICE, METHOD FOR CONTROLLING GAME DEVICE, PROGRAM AND INFORMATION MEMORY MEDIUM

(75) Inventor: Ryuji Mimura, Okayania (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 40 days.

(21) Appl. No.: 13/121,813

(22) PCT Filed: Jun. 3, 2009

(86) PCT No.: PCT/JP2009/060180
§ 371 (c)(1),
(2), (4) Date: Apr. 12, 2011

(87) PCT Pub. No.: WO2010/038509
PCT Pub. Date: Apr. 8, 2010

(65) Prior Publication Data
US 2011/0183756 A1    Jul. 28, 2011

(30) Foreign Application Priority Data

Sep. 30, 2008   (JP) .................................. 2008-254534

(51) Int. Cl.
*A63F 9/24*   (2006.01)
*A63F 13/00*  (2006.01)
*A63F 7/06*   (2006.01)
*A63F 7/20*   (2006.01)

(52) U.S. Cl.
USPC ..... 463/4; 463/7; 463/30; 463/31; 273/108.1; 273/317

(58) Field of Classification Search
USPC .................... 463/4, 7, 30–31; 273/108.1, 317
See application file for complete search history.

(56) References Cited

U.S. PATENT DOCUMENTS

| 6,168,519 B1 | 1/2001 | Nakagawa et al. |
| 2003/0144045 A1 | 7/2003 | Fujita |
| 2008/0085767 A1 | 4/2008 | Takatsuka |
| 2008/0234022 A1* | 9/2008 | Suzuki et al. ..................... 463/4 |

FOREIGN PATENT DOCUMENTS

| JP | 7-178246 A | 7/1995 |
| JP | 11-342269 A | 12/1999 |
| JP | 2002-263363 A | 9/2002 |
| JP | 2002-282535 A | 10/2002 |
| JP | 2002-346221 A | 12/2002 |
| JP | 2003-210848 A | 7/2003 |
| JP | 2004-73241 A | 3/2004 |
| JP | 2006-204671 A | 8/2006 |

OTHER PUBLICATIONS

"Liberogrande 2", Dengeki PlayStation D35, Media Works Inc., Sep. 22, 2000, pp. 42, vol. 6, No. 22, Whole No. 148.

* cited by examiner

*Primary Examiner* — Werner Garner
(74) *Attorney, Agent, or Firm* — Sughrue Mion, PLLC (57) ABSTRACT

To provide a game device that allows a user to grasp a positional situation of a user character relatively easily in a game device for executing a game based on a position of the user character that moves in a game space according to an operation of the user. Position storage means (70a) stores the position of the user character that moves in the game space according to the operation of the user. Determination means (74) determines whether or not the position of the user character satisfies a positional condition regarding the position of the user character. Display control means (76) controls, based on a determination result obtained by the determination means (74), display-output related to a game character that is not being operated by the user.

11 Claims, 9 Drawing Sheets

| POSITION OF USER CHARACTER | EXPRESSION OF TEAMMATE CHARACTER |
|---|---|
| POSITION WHERE "OFFSIDE" FOUL IS CALLED | ANGRY EXPRESSION |
| POSITION WHERE OPPONENT CHARACTER IS HIGHLY LIKELY TO INTERCEPT PASS TOWARD USER CHARACTER | PUZZLED EXPRESSION |
| POSITION WHERE PASS TOWARD USER CHARACTER IS HIGHLY LIKELY TO BE SUCCESSFUL | SMILING EXPRESSION |

| POSITION OF USER CHARACTER | WAITING TIME |
|---|---|
| POSITION WHERE "OFFSIDE" FOUL IS CALLED | T1 |
| POSITION WHERE OPPONENT CHARACTER IS HIGHLY LIKELY TO INTERCEPT PASS TOWARD USER CHARACTER | T2 |
| POSITION WHERE PASS TOWARD USER CHARACTER IS HIGHLY LIKELY TO BE SUCCESSFUL | 0 |

GAME DEVICE, METHOD FOR CONTROLLING GAME DEVICE, PROGRAM AND INFORMATION MEMORY MEDIUM

CROSS REFERENCE TO RELATED APPLICATION

This application is a National Stage of International Application No. PCT/JP2009/060180 filed Jun. 3, 2009, claiming priority based on Japanese Patent Application No. 2008-254534, filed Sep. 30, 2008, the contents of all of which are incorporated herein by reference in their entirety.

TECHNICAL FIELD

The present invention relates to a game device, a method for controlling a game device, a program, and an information storage medium.

BACKGROUND ART

There is known a game device for executing a game based on a position of a user character that moves in a game space according to a user's operation. For example, there is known a game device for executing a soccer game simulating a soccer match between a first team to which a user character belongs and a second team as an opponent of the first team.

PRIOR ART DOCUMENT

Patent Document

Patent Document 1: JP 2006-204671 A

DISCLOSURE OF THE INVENTION

Problems to be Solved by the Invention

In such a game as described above, only a certain limited area in the game space is displayed on a game screen, and hence it may be difficult for the user to grasp a positional situation of the user character from the game screen. For example, in a so-called first-person soccer game in which a virtual camera is set at an eye position of the user character, it may be difficult for the user to grasp from the game screen whether or not the user character is in a position where an "offside" foul will be called.

The present invention has been made in view of the above-mentioned problem, and it is an object of the present invention to provide a game device, a method for controlling a game device, a program, and an information storage medium which allow a user to grasp a positional situation of a user character relatively easily in a game device for executing a game based on a position of the user character that moves in a game space according to a user's operation.

Means for Solving the Problems

In order to solve the above-mentioned problem, a game device according to the present invention includes: position storage means for storing a position of a user character that moves in a game space according to an operation of a user; determination means for determining whether or not the position of the user character satisfies a positional condition regarding the position of the user character; and display control means for controlling, based on a determination result obtained by the determination means, display-output related to a game character that is not being operated by the user.

Further, a method for controlling a game device according to the present invention includes: reading storage content of position storage means for storing a position of a user character that moves in a game space according to an operation of a user; determining whether or not the position of the user character satisfies a positional condition regarding the position of the user character; and controlling, based on a determination result obtained in the determining, display-output related to a game character that is not being operated by the user.

Further, a program according to the present invention causes a computer, such as a consumer game machine, a portable game machine, a mobile phone, a personal digital assistant (PDA), or a personal computer, to function as: means for reading storage content of position storage means for storing a position of a user character that moves in a game space according to an operation of a user; determination means for determining whether or not the position of the user character satisfies a positional condition regarding the position of the user character; and display control means for controlling, based on a determination result obtained by the determination means, display-output related to a game character that is not being operated by the user.

Further, an information storage medium according to the present invention is a computer-readable information storage medium storing the above-mentioned program.

According to the present invention, it is possible to allow the user to grasp the positional situation of the user character relatively easily in the game device for executing a game based on the position of the user character that moves in the game space according to the user's operation.

Further, according to an aspect of the present invention, the game device may further include display control information storage means for storing, in association with the positional condition, display control information regarding the control of the display-output related to the game character. The determination means may determine whether or not the position of the user character satisfies the positional condition associated with the display control information. The display control means may control the display-output related to the game character based on the display control information associated with the positional condition satisfied by the position of the user character.

Further, according to an aspect of the present invention, the display control means may include expression control means for controlling an expression of the game character based on the determination result obtained by the determination means.

Further, according to an aspect of the present invention, the game device may execute a game of a sport that is played between a first team to which the user character belongs and a second team using a moving object. The positional condition may include a condition regarding the position of the user character and a position of an opponent character belonging to the second team. The determination means may determine whether or not the position of the user character and the position of the opponent character satisfy the positional condition.

Further, according to an aspect of the present invention, the game device may execute a game of a sport that is played between a first team to which the user character belongs and a second team using a moving object. The game character may be a teammate character belonging to the first team and being in possession of the moving object. The positional condition may include a condition regarding the position of the user character and a position of the teammate character or a position of the moving object. The determination means may determine whether or not the position of the user character and the position of the teammate character or the position of the moving object satisfy the positional condition.

Further, according to an aspect of the present invention, the game device may execute a game of a sport that is played between a first team to which the user character belongs and a second team using a moving object. The game character may be a teammate character belonging to the first team and being in possession of the moving object. The game device may further include: pass execution means for causing, based on an instruction operation of the user, the teammate character to execute a pass toward a position determined based on the position of the user character; reference time information storage means for storing, in association with the positional condition, reference time information regarding a reference period of time to be taken until the pass is executed; and wait means for suspending the execution of the pass based on the reference time information associated with the positional condition satisfied by the position of the user character.

BEST MODE FOR CARRYING OUT THE INVENTION

Hereinafter, detailed description is given of an example of an embodiment of the present invention with reference to the drawings. A game device according to this embodiment is implemented by, for example, a consumer game machine (stationary game machine), a portable game machine, a mobile phone, a personal digital assistant (PDA), a personal computer, a server computer, or the like. Herein, description is given of a case where the game device according to the embodiment of the present invention is implemented by using a consumer game machine.

1. CONFIGURATION

Figure 1:
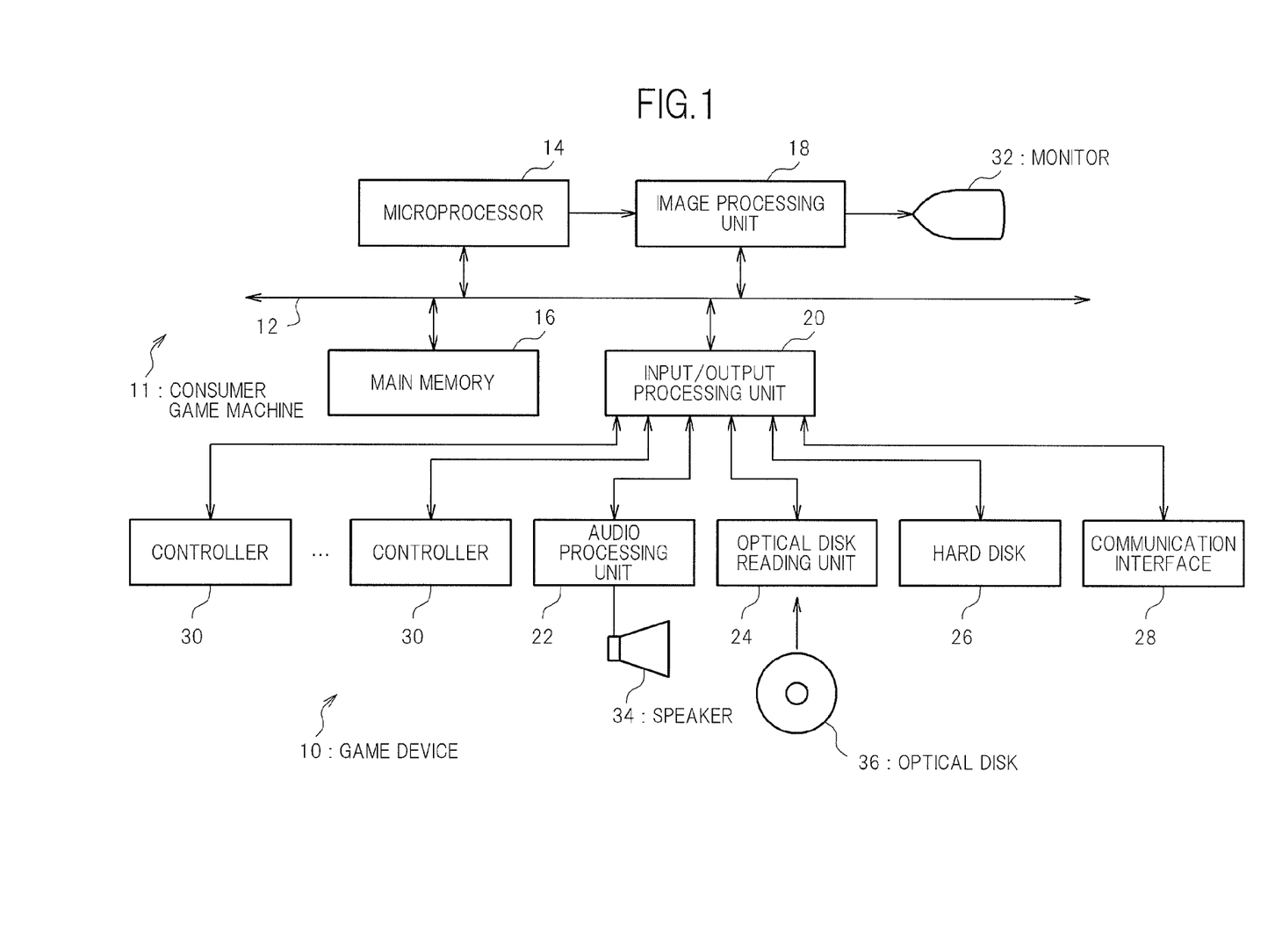
FIG. 1 is a diagram illustrating an overall configuration of a game device according to an embodiment of the present invention.

FIG. 1 is a diagram illustrating an overall configuration of a game device 10 according to this embodiment. As illustrated in FIG. 1, the game device 10 includes a consumer game machine 11, a monitor 32, a speaker 34, and an optical disk 36 (information storage medium). The monitor 32 and the speaker 34 are connected to the consumer game machine 11. For example, a home-use television set is used as the monitor 32, and a speaker built into the home-use television set is used as the speaker 34.

The consumer game machine 11 is a computer game system and includes a bus 12, a microprocessor 14, a main memory 16, an image processing unit 18, an input/output processing unit 20, an audio processing unit 22, an optical disk reading unit 24, a hard disk 26, a communication interface 28, and a controller 30.

The microprocessor 14 executes various types of information processing based on an operating system stored in a ROM (not shown), or a program read from the optical disk 36. The main memory 16 includes, for example, a RAM. The program and data read from the optical disk 36 are written to the main memory 16 if necessary. The main memory 16 is also used as a working memory for the microprocessor 14. The bus 12 is used for exchanging addresses and data among the units of the consumer game machine 11.

The image processing unit 18 includes a VRAM, and renders a game screen in the VRAM based on image data supplied from the microprocessor 14. The game screen rendered in the VRAM is converted into a video signal and output to the monitor 32 at a predetermined time.

The input/output processing unit 20 is an interface for the microprocessor 14 to access the audio processing unit 22, the optical disk reading unit 24, the hard disk 26, the communication interface 28, and the controller 30. The audio processing unit 22 includes a sound buffer and outputs, from the speaker 34, various types of audio data (for example, game music, game sound effects, and message) that has been read from the optical disk 36 into the sound buffer. The communication interface 28 is an interface for connecting the consumer game machine 11 to a communication network in either a wired or wireless manner.

The optical disk reading unit 24 reads a program or data recorded on the optical disk 36. Herein, the optical disk 36 is used for supplying the program or the data to the consumer game machine 11. Alternatively, another information storage medium, such as a memory card, may be used. Alternatively, the program or the data may be supplied to the consumer game machine 11 from a remote place via a communication network such as the Internet, for example. The hard disk 26 is a commonly-used hard disk device (auxiliary storage device). The program and the data, which are assumed to be stored in the optical disk 36 in the following description, may be stored in the hard disk 26.

The controller 30 is general-purpose operation means for a user to execute game operations. A plurality of the controllers 30 may be connected to the consumer game machine 11 in either a wired or wireless manner. The input/output processing unit 20 scans an operation state of the controller 30 every predetermined cycle (for example, every $1/60^{th}$ of a second), and then transfers an operation signal indicating a result of the scanning to the microprocessor 14 via the bus 12. The microprocessor 14 determines the user's game operation based on the operation signal.

On the game device 10, for example, a soccer game simulating a soccer match between a team A and a team B is executed. Hereinafter, the description is given assuming a case where the team A is operated by the user while the team B is operated by a computer. Note that the team B may be operated by another user.

2. GAME SPACE

Figure 2:
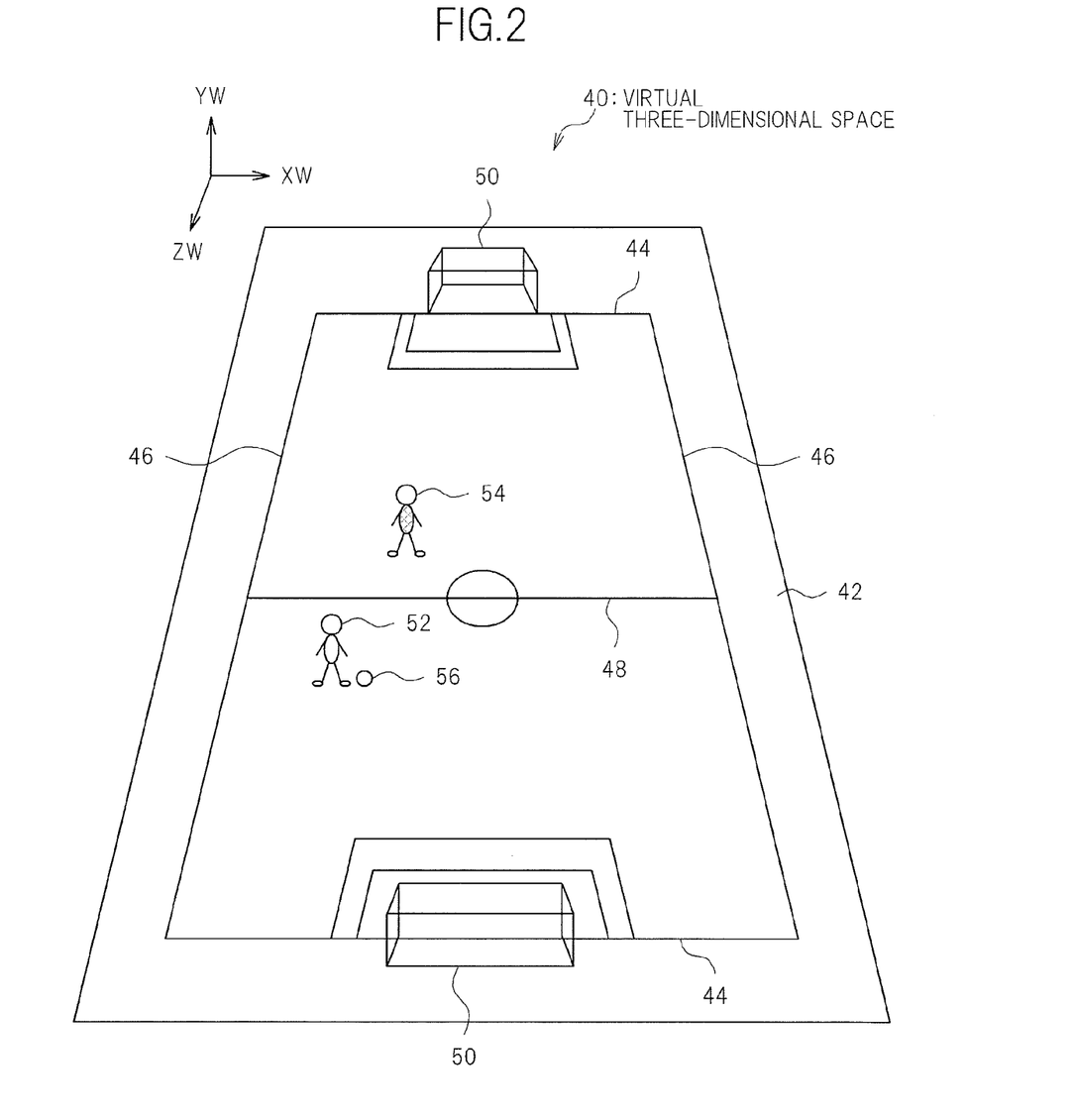
FIG. 2 is a diagram illustrating an example of a game space.

On the game device 10, a game space is built in the main memory 16 in order to generate a game screen. FIG. 2 illustrates an example of the game space. The game space illustrated in FIG. 2 is a virtual three-dimensional space 40, in which positions and the like are expressed by three coordinate elements (XW, YW, and ZW). As illustrated in FIG. 2, a field 42, which is an object representing a soccer field, is disposed in the virtual three-dimensional space 40. For example, goal lines 44, touchlines 46, a half-way line 48, and the like are marked on the field 42. Further, goals 50, which are objects representing soccer goals, player characters 52 and 54, which are objects representing soccer players, and a ball 56, which is an object representing a soccer ball, are disposed on the field 42. The objects disposed in the virtual three-dimensional space 40 include a plurality of polygons.

One of the goals 50 is associated with the team A, whereas the other one of the goals 50 is associated with the team B. When the ball 56 moves into the goal 50 associated with the team B, a scoring event occurs for the team A, and when the ball 56 moves into the goal 50 associated with the team A, a scoring event occurs for the team B.

The player character 52 belongs to the team A, whereas the player character 54 belongs to the team B. In order to control postures and facial expressions of the player characters 52 and 54, a plurality of skeletons (bones and joints) are set inside the player characters 52 and 54. The plurality of skeletons have a hierarchy, in which a change in state (for example, position and rotation angle) of an upper-level skeleton induces a change in state of a lower-level skeleton. For example, a change of a cheek skeleton (skeleton corresponding to a cheek) induces a change in state of a jaw skeleton (skeleton corresponding to a jaw), which is a lower-level skeleton compared to the cheek skeleton. Each skeleton is associated with vertices of one or a plurality of polygons, and the positions of the vertices of the polygon associated with the skeleton change based on the state of the skeleton. By controlling the state of the skeleton as described above, the postures and facial expressions of the player characters 52 and 54 are controlled.

Although omitted in FIG. 2, eleven player characters 52 belonging to the team A and eleven player characters 54 belonging to the team B are disposed on the field 42. Any one of the eleven player characters 52 belonging to the team A is set as a user's operation subject. The player character 52 set as the user's operation subject (hereinafter, referred to as "user character") takes an action according to a user's operation. The other player characters 52 belonging to the team A (hereinafter, referred to as "teammate characters") each take an action according to an operation of the computer. The eleven player characters 54 belonging to the team B (hereinafter, referred to as "opponent characters") each take an action according to an operation of the computer as well.

When the player character 52 or 54 and the ball 56 come close to each other, the player character 52 or 54 and the ball 56 are associated with each other under a predetermined condition. In this case, the moving action of the player character 52 or 54 is a dribbling action. The state in which the ball 56 is associated with the player character 52 or 54 is hereinafter referred to as a state in which "the player character 52 or 54 is in possession of the ball 56".

3. GAME SCREEN

Figure 3:
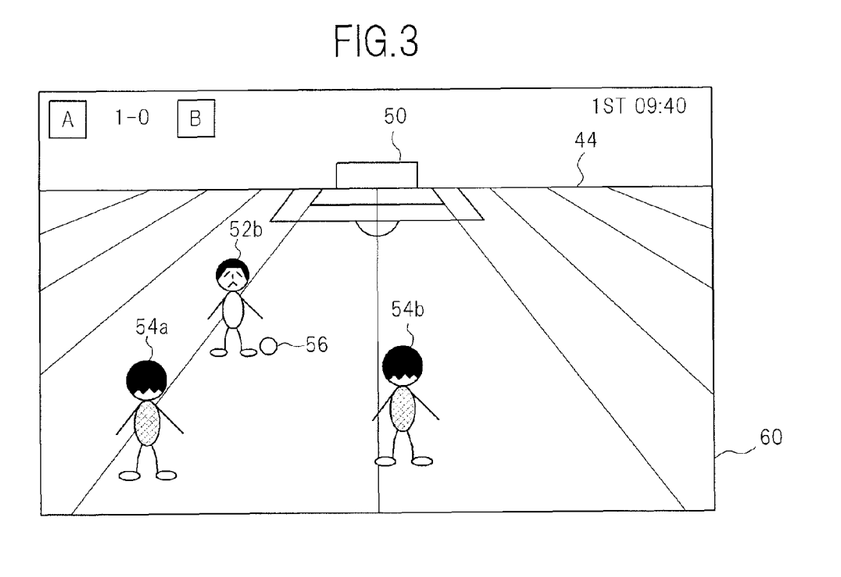
FIG. 3 is a diagram illustrating an example of a game screen.

A virtual camera (viewpoint) is set in the virtual three-dimensional space 40. A game screen showing a situation of the virtual three-dimensional space 40 viewed from the virtual camera is displayed on the monitor 32. In this embodiment, the virtual camera is set at the eye position of the user character, and an image showing a situation of the virtual three-dimensional space 40 viewed from the user character is displayed on the game screen. FIG. 3 illustrates an example of the game screen. A teammate character 52b in possession of the ball 56 and opponent characters 54a and 54b are displayed on a game screen 60 illustrated in FIG. 3.

4. PASS REQUEST FUNCTION

In this embodiment, when the teammate character is in possession of the ball 56, the user may request the teammate character to pass the ball 56 toward the user character by depressing a predetermined button (hereinafter, referred to as "pass request button") of the controller 30. For example, when the user depresses the pass request button in the state illustrated in FIG. 3, the teammate character 52b in possession of the ball 56 executes a pass toward the user character.

Figure 4:
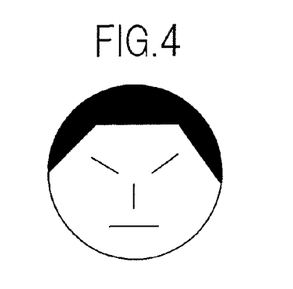
FIG. 4 is a diagram illustrating an example of an expression of a teammate character.
Figure 5:
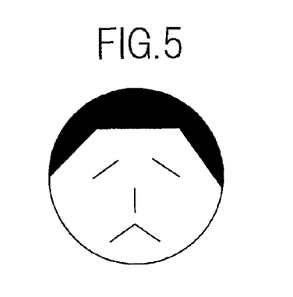
FIG. 5 is a diagram illustrating another example of the expression of the teammate character.
Figure 6:
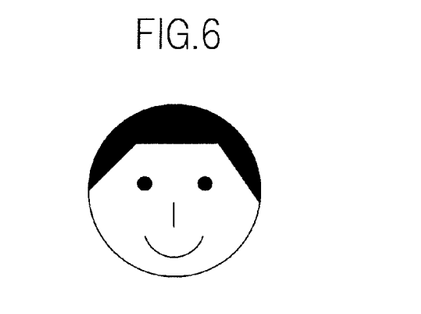
FIG. 6 is a diagram illustrating still another example of the expression of the teammate character.

Further, in this embodiment, the expression of the teammate character changes based on a positional situation of the user character. FIGS. 4, 5, and 6 illustrate examples of the expression of the teammate character.

FIG. 4 illustrates an "angry expression" of the teammate character. In the state illustrated in FIG. 3, for example, when the user character is in a position where an "offside" foul will be called if the teammate character 52b executes a pass toward the user character, the expression of the teammate character 52b is set to the angry expression as illustrated in FIG. 4.

FIG. 5 illustrates a "puzzled expression" of the teammate character. In the state illustrated in FIG. 3, for example, when the user character is in a position where the opponent character 54a or 54b is highly likely to intercept a pass from the teammate character 52b toward the user character, the expression of the teammate character 52b is set to the puzzled expression as illustrated in FIG. 5.

FIG. 6 illustrates a "smiling expression" of the teammate character. In the state illustrated in FIG. 3, for example, when the user character is in a position where the teammate character 52b is highly likely to make a pass toward the user character successfully, the expression of the teammate character 52b is set to the smiling expression as illustrated in FIG. 6.

In the state illustrated in FIG. 3, for example, the user can grasp the positional situation of the user character based on the expression of the teammate character 52b, and as a result, the user can decide, in consideration of the positional situation of the user character, whether or not the user should depress the pass request button.

5. FUNCTIONAL BLOCKS

Figure 7:
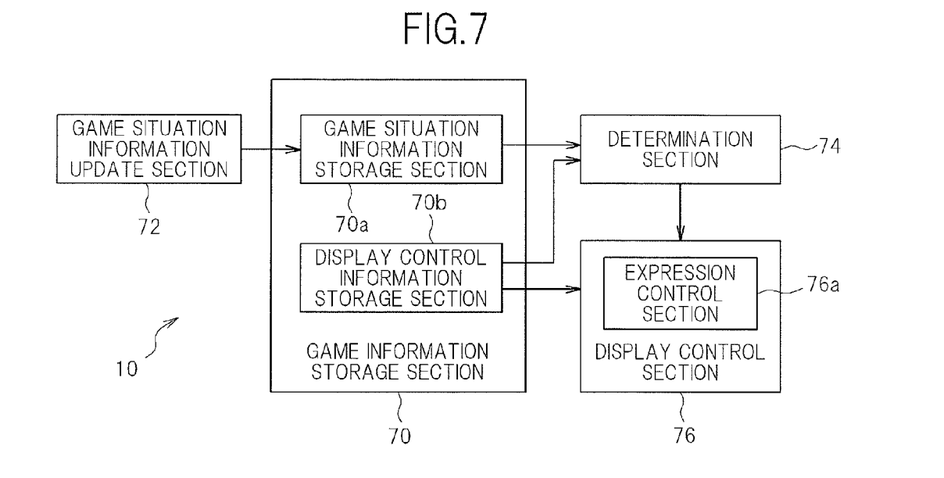
FIG. 7 is a functional block diagram of the game device according to the embodiment.

Description is given of a configuration related to the above-mentioned function (function for allowing the user to grasp the positional situation of the user character). FIG. 7 is a functional block diagram illustrating functional blocks related to the above-mentioned function. As illustrated in FIG. 7, the game device 10 includes a game information storage section 70, a game situation information update section 72, a determination section 74, and a display control section 76. The game information storage section 70 is implemented mainly by, for example, the main memory 16 and the optical disk 36, and the other functional blocks are implemented mainly by, for example, the microprocessor 14.

The game information storage section 70 stores information necessary to execute the soccer game. The game information storage section 70 includes a game situation information storage section 70a and a display control information storage section 70b.

The game situation information storage section 70a (position storage means) is implemented by, for example, the main memory 16. The game situation information storage section 70a stores game situation information, which indicates a current situation of the game. The game situation information includes, for example, the following information:
(1) information indicating the state of each of the player characters 52 and 54 (for example, position, state of the skeletons, moving direction, and the like);
(2) information indicating the state of the ball 56 (for example, position, moving direction, and the like);
(3) information indicating the player character 52 or 54 that is in possession of the ball 56;
(4) information indicating the player character 52 that is being operated by the user;
(5) information indicating scoring statuses of the team A and the team B; and
(6) information indicating an elapsed time period.

In a case of, for example, a first-person game in which the user character is not generated (that is, game in which the virtual camera is set at the eye position of the user character), the position of the virtual camera (viewpoint) that moves according to the user's operation corresponds to the position of the user character.

Figure 8:
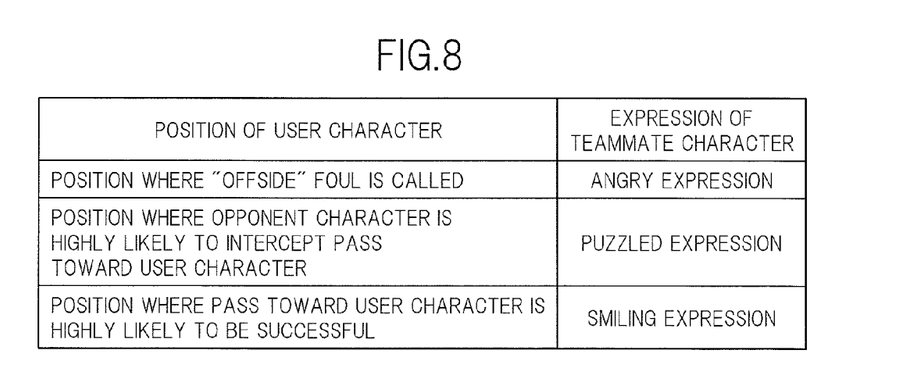
FIG. 8 is a diagram illustrating an example of storage contents of a display control information storage section.

The display control information storage section 70b is implemented by, for example, the optical disk 36. The display control information storage section 70b stores display control information regarding control of display-output related to the teammate character, in association with positional conditions regarding the positions of the user character. In this embodiment, the display control information storage section 70b stores, as the display control information, expression control information regarding control of the expression of the teammate character. FIG. 8 illustrates an example of storage contents of the display control information storage section 70b. For example, information as illustrated in FIG. 8 may be stored in a table format or as part of a program.

The game situation information update section 72 updates the game situation information. For example, the game situation information update section 72 updates the state (for example, position, posture, moving direction and the like) of the user character based on the user's operation. Further, for example, the game situation information update section 72 also updates the states (for example, positions, moving directions, and the like) of the teammate character, the opponent character, and the ball 56.

The determination section 74 determines whether or not the position of the user character satisfies the positional conditions regarding the positions of the user character. Operation of the determination section 74 is described later in detail (see S103 and S105 of FIG. 9).

The display control section 76 controls display-output related to the teammate character based on determination results obtained by the determination section 74. For example, the display control section 76 controls display-output related to the teammate character based on the display control information associated with the positional condition satisfied by the position of the user character.

In this embodiment, the display control section 76 includes an expression control section 76a. The expression control section 76a controls the expression of the teammate character based on the determination results obtained by the determination section 74. For example, the expression control section 76a controls the expression of the teammate character based on the expression control information associated with the positional condition satisfied by the position of the user character. Operation of the expression control section 76a is described later in detail (see S104, S106, and S107 of FIG. 9).

6. PROCESSING

Figure 9:
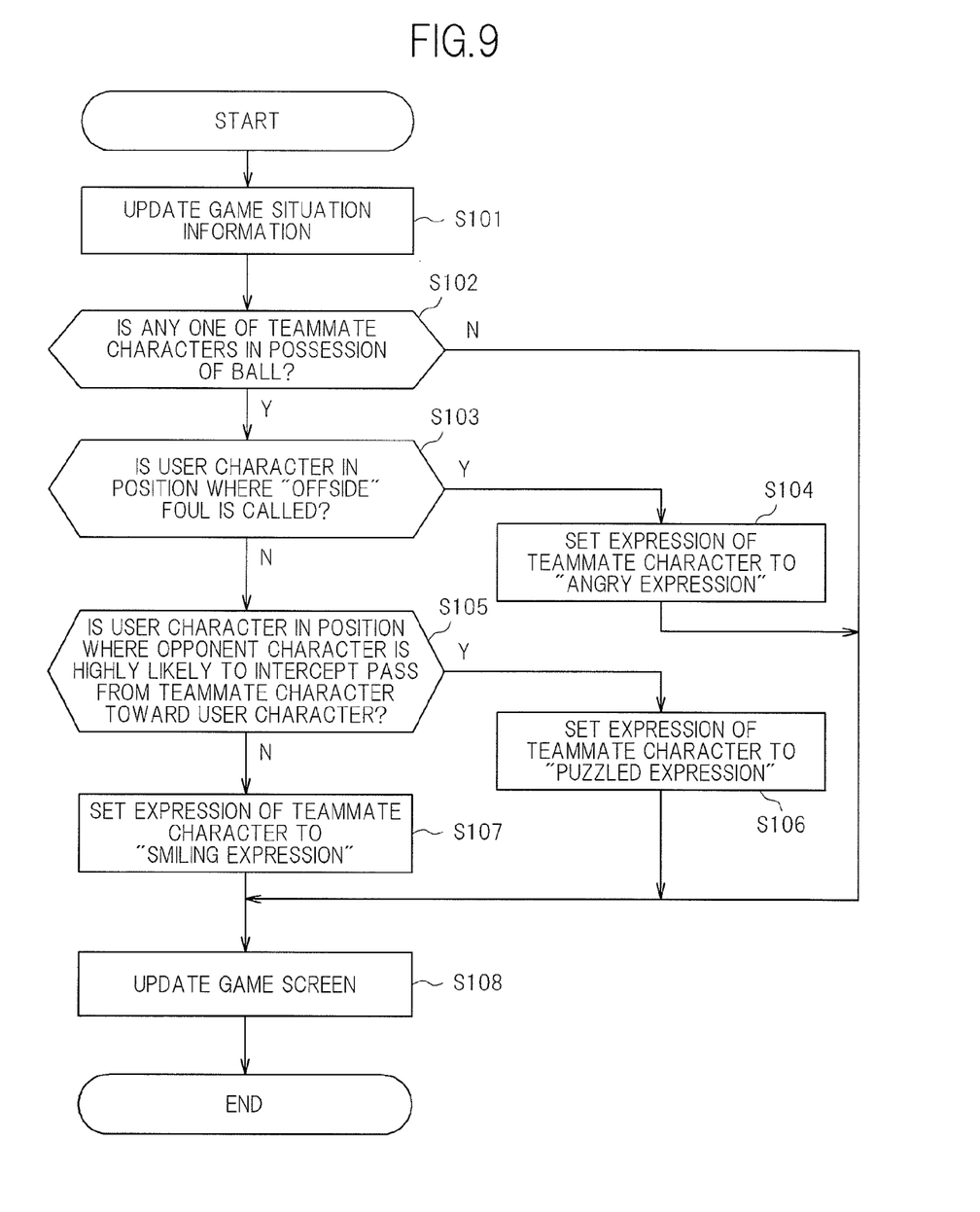
FIG. 9 is a flow chart illustrating processing executed by the game device.

Description is given of processing executed by the game device 10. FIG. 9 is a flow chart mainly illustrating processing related to the present invention, of the processing executed by the game device 10 every predetermined period (for example, $\frac{1}{60}^{th}$ of a second). The microprocessor 14 executes the processing illustrated in FIG. 9 according to the program stored in the optical disk 36. Through the execution of the processing illustrated in FIG. 9, the game situation information update section 72, the determination section 74, and the display control section 76 are implemented.

As illustrated in FIG. 9, the microprocessor 14 (game situation information update section 72) first updates the game situation information (S101). For example, the microprocessor 14 updates the state (for example, position, posture, moving direction, and the like) of the user character based on the user's operation. Further, the microprocessor 14 updates, for example, the states (for example, positions, postures, moving directions, and the like) of the teammate character and the opponent character based on a predetermined algorithm. Still further, the microprocessor 14 updates, for example, the state (for example, position, moving direction, and the like) of the ball 56.

After the game situation information is updated, the microprocessor 14 determines whether or not any one of the teammate characters is in possession of the ball 56 (S102). If any one of the teammate characters is in possession of the ball 56, the microprocessor 14 (determination section 74) determines whether or not the user character is in a position where the "offside" foul will be called if the teammate character executes a pass toward the user character (S103).

Figure 10:
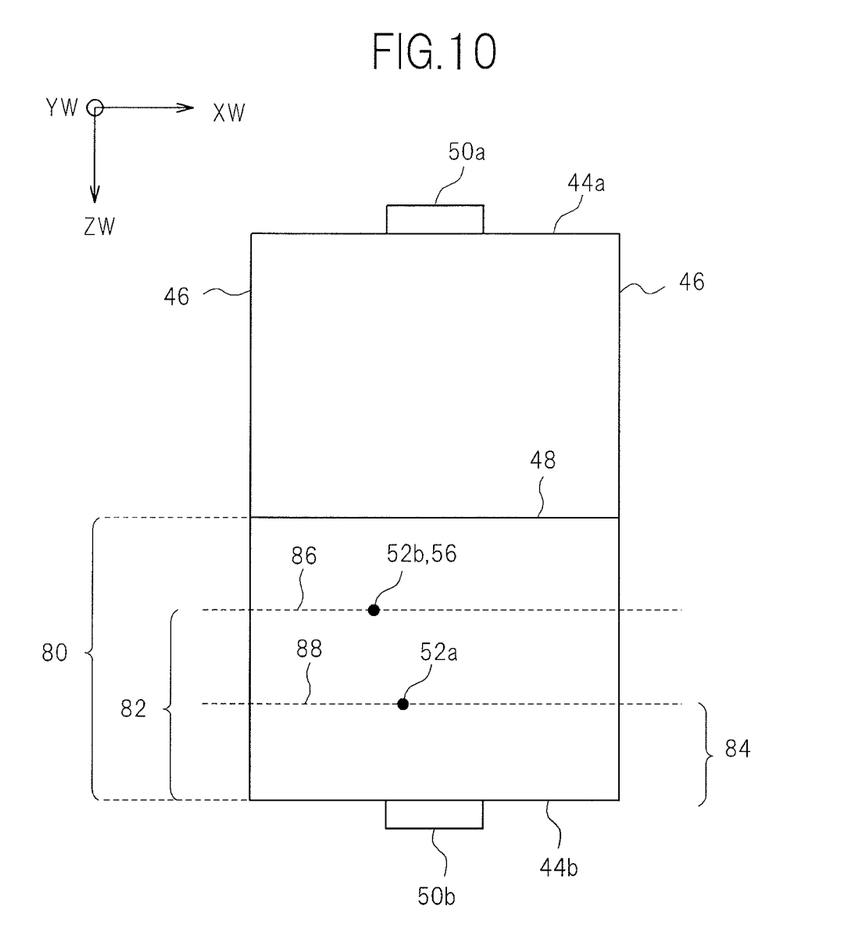
FIG. 10 is an explanatory diagram illustrating a method of determining whether or not a user character is in a position where an "offside" foul will be called.

FIG. 10 is an explanatory diagram illustrating an example of a determination method for the condition of S103. In FIG. 10, reference symbol 50a represents the goal 50 corresponding to the team A, and reference symbol 50b represents the goal 50 corresponding to the team B. Reference symbol 44a represents the goal line 44 on the goal 50a side, and reference symbol 44b represents the goal line 44 on the goal 50b side.

In S103, for example, it is determined whether or not the position of a user character 52a satisfies all the following conditions (A) to (C):
(A) the position of the user character 52a is included in an opponent's half of field 80;
(B) the position of the user character 52a is included in an area 82 between the position of the teammate character 52b in possession of the ball 56 or the position of the ball 56, and the goal line 44b; and
(C) the number of opponent characters positioned in an area 84 between the position of the user character 52a and the goal line 44b is equal to or smaller than one.

Note that the opponent's half of the field 80 in the above-mentioned condition (A) is an area surrounded by the goal line 44b, the two touchlines 46, and the half-way line 48.

The area 82 in the above-mentioned condition (B) is an area surrounded by the goal line 44b, the two touchlines 46, and a straight line 86, which is parallel to an XW axis and passes through the position of the teammate character in possession of the ball 56 or the position of the ball 56. Determination as to the above-mentioned condition (B) corresponds to determination as to whether or not the position of the user character 52a is closer to the goal line 44b than the position of the teammate character 52b in possession of the ball 56 or the position of the ball 56.

The area 84 in the above-mentioned condition (C) is an area surrounded by the goal line 44b, the two touchlines 46, and a straight line 88, which is parallel to the XW axis and passes through the position of the user character 52a. Determination as to the above-mentioned condition (C) corresponds to determination as to whether or not the number of opponent characters positioned closer to the goal line 44b than the user character 52a is equal to or smaller than one.

If all the above-mentioned conditions (A) to (C) are satisfied, it is determined that the user character is in the position where the "offside" foul will be called. If it is determined that the user character is in the position where the "offside" foul will be called, the microprocessor 14 (expression control section 76a) sets the expression of the teammate character in possession of the ball 56 to an "angry expression" (S104). For example, in order that the expression of the teammate character in possession of the ball 56 may become an "angry expression", the microprocessor 14 sets the state of skeletons related to a face of the teammate character to a state corresponding to the "angry expression".

On the other hand, if anyone of the above-mentioned conditions (A) to (C) is not satisfied, it is determined that the user character is not in the position where the "offside" foul will be called. In this case, the microprocessor 14 (determination section 74) determines whether or not the user character is in a position where the opponent character is highly likely to intercept a pass from the teammate character in possession of the ball 56 toward the user character (S105).

Figure 11:
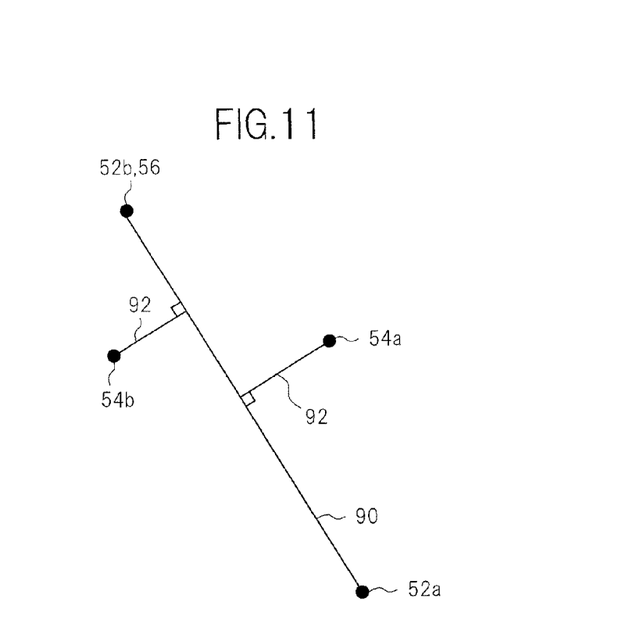
FIG. 11 is an explanatory diagram illustrating a method of determining whether or not the user character is in a position where an opponent character is highly likely to intercept a pass from the teammate character toward the user character.

FIG. 11 is an explanatory diagram illustrating an example of a determination method for the condition of S105. In S105, a straight line 90 extending from the position of the teammate character 52b in possession of the ball 56 or the position of the ball 56 to the user character 52a is first obtained. Further, with regard to the opponent characters 54a and 54b positioned in the vicinity of the straight line 90, lengths of perpendiculars 92 extending from the positions of the opponent characters 54a and 54b to the straight line 90 are obtained. Then, it is determined whether or not the lengths of the perpendiculars 92 are equal to or smaller than a reference length. For example, if the length of at least one of the perpendiculars 92 of the opponent characters 54a and 54b is equal to or smaller than the reference length, it is determined that the opponent character 54a or 54b is highly likely to intercept a pass from the teammate character 52b in possession of the ball 56 toward the user character 52a.

If the user character is in the position where the opponent character is highly likely to intercept a pass from the teammate character in possession of the ball 56 toward the user character, the microprocessor 14 (expression control section 76a) sets the expression of the teammate character in possession of the ball 56 to a "puzzled expression" (S106). For example, in order that the expression of the teammate character in possession of the ball 56 may become a "puzzled expression", the microprocessor 14 sets the state of skeletons related to a face of the teammate character to a state corresponding to the "puzzled expression".

On the other hand, if the user character is not in the position where the opponent character is highly likely to intercept a pass from the teammate character in possession of the ball 56 toward the user character, the microprocessor 14 (expression control section 76a) sets the expression of the teammate character in possession of the ball 56 to a "smiling expression" (S107). For example, in order that the expression of the teammate character in possession of the ball 56 may become a "smiling expression", the microprocessor 14 sets the state of skeletons related to a face of the teammate character to a state corresponding to the "smiling expression". If the user character is not in the position where the opponent character is highly likely to intercept a pass from the teammate character in possession of the ball 56 toward the user character, the microprocessor 14 may set the expression of the teammate character in possession of the ball 56 to a normal expression instead of changing the expression of the teammate character to the "smiling expression".

By the way, the determination as to whether or not the conditions of S103 and S105 are satisfied is made based on the position of the user character and the position of the opponent character. Therefore, the conditions of S103 and S105 are each a condition regarding the position of the user character and the position of the opponent character. Accordingly, the display control information storage section 70b (see FIG. 8) stores, in association with the positional condition regarding the position of the user character and the position of the opponent character, the expression control information regarding control of the expression of the teammate character.

Further, the determination as to whether or not the conditions of S103 and S105 are satisfied is made based on the position of the user character, and the position of the teammate character or the position of the ball 56. Therefore, the conditions of S103 and S105 are each a condition regarding the position of the user character, and the position of the teammate character or the position of the ball 56. Accordingly, the display control information storage section 70b (see FIG. 8) stores, in association with the positional condition regarding the position of the user character and the position of the teammate character or the position of the ball 56, the expression control information regarding control of the expression of the teammate character.

As illustrated in FIG. 9, after the processing of S104, S106, or S107 is executed, the microprocessor 14 updates the game screen 60 (S108). Specifically, the game screen 60 showing a situation of the virtual three-dimensional space 40 viewed from the virtual camera is generated in the VRAM. The game screen 60 generated in the VRAM is displayed on the monitor 32 at a given time.

7. SUMMARY

According to the game device 10 described above, the user can grasp from the game screen the positional situation of the user character based on the expression of the teammate character. For example, the user can grasp, based on the expression of the teammate character, whether or not the user character is in the position where the "offside" foul will be called. Further, for example, the user can grasp, based on the expression of the teammate character, whether or not the user character is in the position where the opponent character is highly likely to intercept a pass from the teammate character in possession of the ball 56 toward the user character. Still further, for example, the user can grasp, based on the expression of the teammate character, whether or not the user character is in the position where the teammate character in possession of the ball 56 is highly likely to make a pass toward the user character successfully. In short, according to the game device 10, the user can grasp the positional situation of the user character relatively easily. As a result, the user can decide, in consideration of the positional situation of the user character, whether or not the user should depress the pass request button.

8. MODIFIED EXAMPLES

Note that the present invention is not limited to the embodiment described above.

8-1. First Modified Example

The expression of the teammate character is not limited to the three kinds of expression illustrated in FIGS. 4 to 6. For example, when the opponent character is positioned behind the user character, the expression of the teammate character in possession of the ball 56 may be set to an expression other than the expressions illustrated in FIGS. 4 to 6.

8-2. Second Modified Example

The display control section 76 may control a display mode other than the expression of the teammate character (for example, color). For example, in S104 of FIG. 9, the color of the teammate character may be set to a first color. Further, in S106 of FIG. 9, the color of the teammate character may be set to a second color. Still further, in S107 of FIG. 9, the color of the teammate character may be set to a third color.

Alternatively, the display control section 76 may display, in association with the teammate character, an image corresponding to the determination results obtained by the determination section 74. For example, the display control section 76 may display a speech balloon image corresponding to the determination results obtained by the determination section 74 in the vicinity of the teammate character (for example, over the head). In this case, character strings or marks to be displayed in the speech balloon are controlled based on the determination results obtained by the determination section 74. Alternatively, the shape of the speech balloon is controlled based on the determination results obtained by the determination section 74. For example, in S104 of FIG. 9, the content or shape of the speech balloon is controlled so as to indicate the anger of the teammate character. Further, in S106 of FIG. 9, the content or shape of the speech balloon is controlled so as to indicate the puzzled state of the teammate character. Still further, in S107 of FIG. 9, the content or shape of the speech balloon is controlled so as to indicate the smile (pleasure) of the teammate character.

Also in the second modified example, the user can grasp the positional situation of the user character relatively easily based on the display mode of the teammate character or the image displayed in association with the teammate character. As a result, the user can decide, in consideration of the positional situation of the user character, whether or not the user should depress the pass request button.

8-3. Third Modified Example

When the user depresses the pass request button, a period of time to be taken until the pass is executed from the teammate character toward the user character may change based on the positional situation of the user character.

Figure 12:
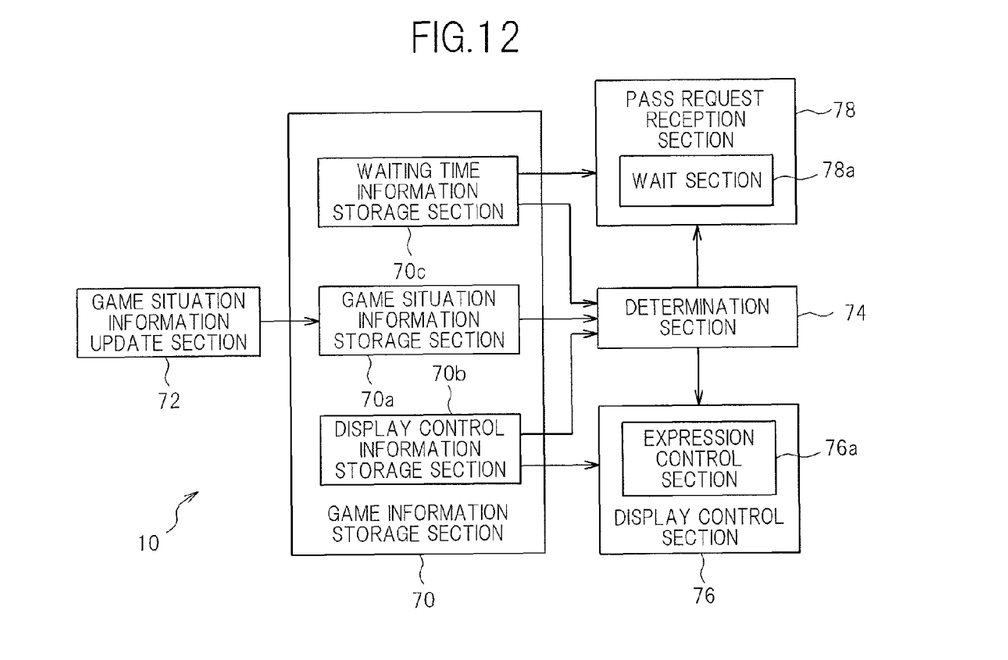
FIG. 12 is a functional block diagram of a game device in a third modified example.

FIG. 12 is a functional block diagram of a game device 10 in the third modified example. In FIG. 12, the same functional blocks as those in the functional block diagram illustrated in FIG. 7 are represented by the same reference symbols, and description of those functional blocks is therefore omitted herein. The functional block diagram illustrated in FIG. 12 is different from the functional block diagram illustrated in FIG. 7 in that a pass request reception section 78 is provided and that the game information storage section 70 includes a waiting time information storage section 70c (reference time information storage means).

Figure 13:
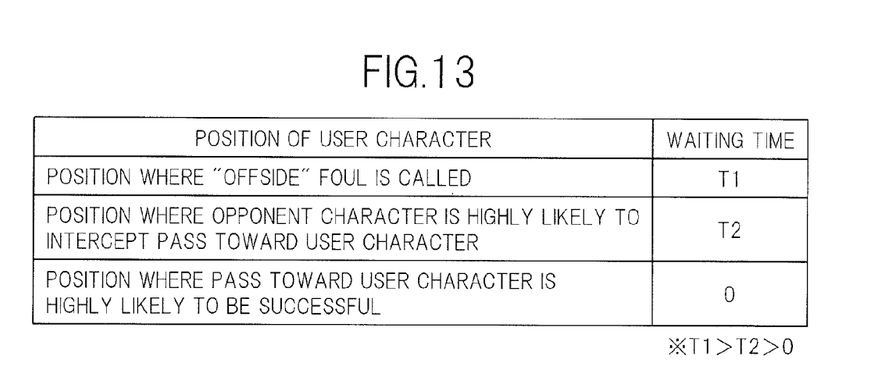
FIG. 13 is a diagram illustrating an example of storage contents of a waiting time information storage section in the third modified example.

The waiting time information storage section 70c is implemented mainly by, for example, the optical disk 36. The waiting time information storage section 70c stores waiting time information regarding a waiting time, in association with the positional condition regarding the position of the user character. FIG. 13 illustrates an example of storage contents of the waiting time information storage section 70c. For example, information as illustrated in FIG. 13 may be stored in a table format or as part of a program.

The pass request reception section 78 is implemented mainly by, for example, the microprocessor 14. The pass request reception section 78 is a functional block related to the pass request function. The pass request reception section 78 receives an execution request for a pass from the teammate character toward the user character. When the above-mentioned execution request is received in a state in which the teammate character is in possession of the ball 56, a pass from the teammate character toward the user character is executed. For example, the ball 56 starts moving toward a current position of the user character or a future position of the user character, which is obtained based on the current position of the user character and the moving direction thereof.

The pass request reception section 78 includes a wait section 78a. The wait section 78a causes the teammate character to suspend execution of the pass toward the user character, based on the waiting time information associated with the positional condition satisfied by the position of the user character.

Figure 14:
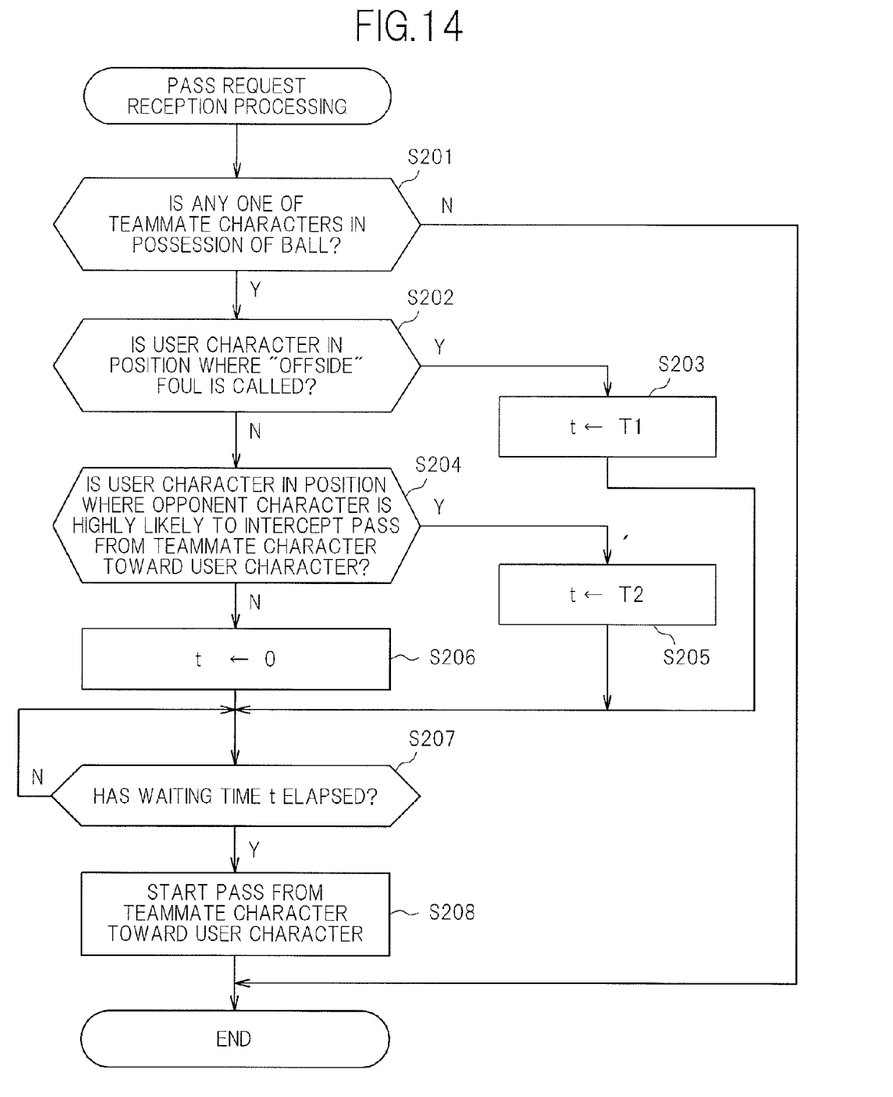
FIG. 14 is a flow chart illustrating processing executed by the game device in the third modified example.

FIG. 14 is a flow chart illustrating processing executed when the pass request button is depressed (pass request reception processing). The microprocessor 14 executes the processing illustrated in FIG. 14 according to the program stored in the optical disk 36. Through the execution of the processing illustrated in FIG. 14, the pass request reception section 78 is implemented.

As illustrated in FIG. 14, if the pass request button is depressed, the microprocessor 14 determines whether or not any one of the teammate characters is in possession of the ball 56 (S201). If there is no teammate character in possession of the ball 56, the processing ends. On the other hand, if any one of the teammate characters is in possession of the ball 56, the microprocessor 14 (determination section 74) determines whether or not the user character is in a position where the "offside" foul will be called if the teammate character executes a pass toward the user character (S202). The processing of S202 is the same as the processing of S103 of FIG. 9.

If the user character is in the position where the "offside" foul will be called, the microprocessor 14 (wait section 78a) sets a variable t to a predetermined value T1 (S203). On the other hand, if the user character is not in the position where the "offside" foul will be called, the microprocessor 14 (determination section 74) determines whether or not the user character is in a position where the opponent character is highly likely to intercept a pass from the teammate character in possession of the ball 56 toward the user character (S204). The processing of S204 is the same as the processing of S105 of FIG. 9.

If the user character is in the position where the opponent character is highly likely to intercept a pass from the teammate character in possession of the ball 56 toward the user character, the microprocessor 14 (wait section 78a) sets the variable t to a predetermined value T2 (S205). Note that, T2 takes, for example, a smaller value than T1.

On the other hand, if the user character is not in the position where the opponent character is highly likely to intercept a pass from the teammate character in possession of the ball 56 toward the user character, the microprocessor 14 (wait section 78a) sets the variable t to 0 (S206).

After the processing of S203, S205, or S206 is executed, the microprocessor 14 (wait section 78a) monitors whether or not the waiting time t has elapsed since a reference time (S207). The reference time herein refers to, for example, a time when the pass request button is depressed or a time when the execution of the processing of S203, S205, or S206 is completed.

If an elapsed time period since the reference time has reached the waiting time t, the microprocessor 14 (pass execution means) starts executing the pass from the teammate character toward the user character (S208). In this case, the teammate character in possession of the ball 56 is controlled so as to execute the pass toward the user character. Specifically, the posture of the teammate character is controlled so as to execute a passing action (kicking action). Further, the position, the moving direction, and the like of the ball 56 are controlled so that the ball 56 moves toward a pass target position. The pass target position is determined based on the position of the user character.

In the third modified example, if the pass request button is depressed in a state in which the user character is in the position where the "offside" foul will be called, the teammate character in possession of the ball 56 suspends execution of the pass toward the user character for the predetermined period of time (T1). In this period, the user may move the user character to a position where the "offside" foul will be not called.

In the third modified example, if the pass request button is depressed in a state in which the user character is in the position where the opponent character is highly likely to intercept a pass from the teammate character in possession of the ball 56 toward the user character, the teammate character in possession of the ball 56 suspends execution of the pass toward the user character for the predetermined period of time (T2). In this period, the user may move the user character to a position where the teammate character is highly likely to make a pass toward the user character successfully.

Note that the user can predict, based on the expression of the teammate character, a period of time (waiting time) to be taken until the execution of the pass is started when the pass request button is depressed.

8-4. Other Modified Examples

The virtual camera does not need to beset at the eye position of the user character. For example, the virtual camera may be set behind and above the user character.

The game space may be a two-dimensional space, in which positions and the like are expressed by two coordinate elements.

The present invention is also applicable to a game device 10 for executing a sports game other than the soccer game. For example, the present invention is also applicable to a game device 10 for executing a game of basketball or American football that is played using a ball (moving object). Further, for example, the present invention is also applicable to a game device 10 for executing a game of ice hockey that is played using a puck (moving object). Still further, the present invention is also applicable to a game device 10 for executing a game other than sports games.

The invention claimed is:

1. A game device that executes a sport game played between a first team to which a user character belongs and a second team using a moving object, the game device comprising:
　a section that refers to a position of the user character stored in a game information storage section that stores the position of the user character that moves in a game space according to an operation of a user;
　a determination section that makes a determination whether the position of the user character satisfies a positional condition regarding the position of the user character; and
　a display controller that controls, based on the determination, display-output related to a teammate character that belongs to the first team and is in possession of the moving object but is not being operated by the user;
　a pass execution section that causes, based on an instruction operation of the user, the teammate character to execute a pass toward a position determined based on the position of the user character;
　a section that refers to reference time information stored in a reference time information storage section that stores, in association with the positional condition, the reference time information regarding a reference period of time to be taken until the pass is executed; and
　a wait section that delays the execution of the pass from the teammate character toward the position determined based on the position of the user character, based on the reference time information associated with the positional condition satisfied by the position of the user character.

2. The game device according to claim 1, further comprising
　a section that refers to storage content of a display control information storage section that stores, in association with the positional condition, display control information regarding the control of the display-output related to the teammate character,
　wherein the determination section determines whether the position of the user character satisfies the positional condition associated with the display control information, and
　wherein the display controller controls the display-output related to the teammate character based on the display control information associated with the positional condition satisfied by the position of the user character.

3. The game device according to claim 1,
　wherein the display controller comprises an expression control section that controls an expression of the teammate character based on the determination.

4. The game device according to claim 1,
　wherein the positional condition comprises a condition regarding the position of the user character and a position of an opponent character belonging to the second team, and
　wherein the determination section determines whether the position of the user character and the position of the opponent character satisfy the positional condition.

5. The game device according to claim 1,
wherein the positional condition comprises a condition regarding the position of the user character with respect to either a position of the teammate character or a position of the moving object, and
wherein the determination section determines whether the position of the user character with respect to either the position of the teammate character or the position of the moving object satisfy the positional condition.

6. A method for controlling a game device including at least one memory and at least one microprocessor, the game device executing a sport game that is played between a first team to which a user character belongs and a second team using a moving object, the method comprising:
referring to storage content of a game information storage section that stores a position of the user character that moves in a game space according to an operation of a user;
determining, by the at least one microprocessor, whether the position of the user character satisfies a positional condition regarding the position of the user character; and
controlling, by the at least one microprocessor based on the determination result, display-output related to a teammate character that belongs to the first team and is in possession of the moving object but is not being operated by the user,
causing, based on an instruction operation of the user, the teammate character to execute a pass toward a position determined based on the position of the user character;
referring to storage content of a reference time information storage section that stores, in association with the positional condition, reference time information regarding a reference period of time to be taken until the pass is executed; and
delaying the execution of the pass from the teammate character toward the position determined based on the position of the user character, based on the reference time information associated with the positional condition satisfied by the position of the user character.

7. A non-transitory computer-readable information storage medium storing a program causing a computer to execute a sport game that is played between a first team to which a user character belongs and a second team using a moving object, the program further causing the computer to function as:
a section that refers to storage content of a game information storage section that stores a position of the user character that moves in a game space according to an operation of a user;
a determination section that makes a determination whether the position of the user character satisfies a positional condition regarding the position of the user character; and
a display control section that controls, based on the determination, display-output related to a teammate character that belongs to the first team and is in possession of the moving object but is not being operated by the user;
a pass execution section that causes, based on an instruction operation of the user, the teammate character to execute a pass toward a position determined based on the position of the user character;
a section that refers to storage content of a reference time information storage section that stores, in association with the positional condition, reference time information regarding a reference period of time to be taken until the pass is executed; and
a wait section that delays the execution of the pass from the teammate character toward the position determined based on the position of the user character, based on the reference time information associated with the positional condition satisfied by the position of the user character.

8. A game device that executes a sport game played between a first team to which a user character belongs and a second team using a moving object, the game device comprising:
at least one microprocessor configured to:
refer to positions of the characters stored in a storage that stores positions in a game space of characters of the first team and the second team,
determine whether the position of the user character that is operated by a user satisfies a positional condition with respect to a position of at least one character of the second team,
control an expression of a teammate character of the user character based on the determination, the teammate character being in possession of the moving object but not being operated by the user,
refer to reference time information stored in a storage that stores the reference time information, and
delay execution of a pass from the teammate character toward a position determined based on a position of the user character based on the reference time information.

9. The game device according to claim 8, wherein the expression comprises a facial expression of the teammate character.

10. A method for controlling a game device including at least one memory and at least one microprocessor, the game device executing a sport game that is played between a first team to which a user character belongs and a second team using a moving object, the method comprising:
referring to positions of the characters stored in a storage that stores positions in a game space of characters of the first team and the second team;
determining, by the at least one microprocessor, whether the position of the user character that is operated by a user satisfies a positional condition with respect to a position of at least one character of the second team,
controlling, by the at least one microprocessor, an expression of a teammate character of the user character based on the determination, the teammate character being in possession of the moving object but not being operated by the user,
referring to reference time information stored in a storage that stores the reference time information, and
delaying, by the at least one microprocessor, execution of a pass from the teammate character toward a position determined based on a position of the user character based on the reference time information.

11. A non-transitory computer-readable information storage medium storing a program causing a computer to execute a sport game that is played between a first team to which a user character belongs and a second team using a moving object, the program further causing the computer to function as:
a referring section that refers to positions of the characters stored in a storage that stores positions in a game space of characters of the first team and the second team; and
a controller that determines whether the position of the user character that is operated by a user satisfies a positional condition with respect to a position of at least one character of the second team, controls an expression of a teammate character of the user character based on the determination, the teammate character being in possession of the moving object but not being operated by the user, refers to reference time information stored in a storage that stores the reference time information, and delays, based on the reference time information, execution of a pass from the teammate character toward a position determined based on a position of the user character.

* * * * *